(12) United States Patent
Cheng

(10) Patent No.: US 6,498,216 B1
(45) Date of Patent: Dec. 24, 2002

(54) DYEABLE FLUOROPOLYMER FIBERS AND FILMS

(75) Inventor: Uy William Cheng, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/701,110

(22) PCT Filed: May 26, 1999

(86) PCT No.: PCT/US99/11555

§ 371 (c)(1),
(2), (4) Date: Nov. 21, 2000

(87) PCT Pub. No.: WO99/63000

PCT Pub. Date: Dec. 9, 1999

Related U.S. Application Data

(60) Provisional application No. 60/087,287, filed on May 29, 1998.

(51) Int. Cl.⁷ .............................. C08L 27/18; C08J 5/18
(52) U.S. Cl. ....................................... 525/199; 525/200
(58) Field of Search ................................. 525/199, 200

(56) References Cited

U.S. PATENT DOCUMENTS

| | | | |
|---|---|---|---|
| 3,282,875 A | 11/1966 | Connelly et al. | |
| 3,692,569 A | 9/1972 | Grot | |
| 3,940,916 A | 3/1976 | Grot | |
| 4,214,070 A | 7/1980 | Krespan | |
| 4,349,650 A | 9/1982 | Krespan | |

FOREIGN PATENT DOCUMENTS

| | | |
|---|---|---|
| DE | 4131746 A1 | 3/1993 |
| EP | 0345964 A1 | 12/1989 |
| WO | WO 98/58105 A1 | 12/1998 |

*Primary Examiner*—Nathan M. Nutter

(57) ABSTRACT

This invention relates to fluoropolymer fibers and films which can be modified by cationic agents, such as cationic dyes. The fiber or film comprises a blend of a first and a second copolymer, or it comprises a terpolymer, the blend or terpolymer having (1) an acid or ionic functionality provided by a pendant group represented by the formula —(O—$CF_2CFR)_aO$—$CF_2CFR'SO_3^-Z^+$, wherein R and R' are independently selected from F, Cl or a perfluorinated alkyl group having 1 to 10 carbon atoms, a=0, 1 or 2, and $Z^+$ is $H^+$, an alkali metal cation, or a cation derived from a compound selected from the group consisting of a cationic dye, a cationic whitener, a cationic flame retardant, a cationic antistatic agent, and mixtures thereof, and (2) a larger amount of a fluoroalkylvinylether, a fluoroalkene, or ethylene functionality. Such fibers and films are useful in various consumer goods where the product is desirably colored, whitened, antistatic, or flame retardant.

6 Claims, 3 Drawing Sheets

DYEABLE FLUOROPOLYMER FIBERS AND FILMS

CROSS-REFERENCE TO RELATED APPLICATIONS

This application was filed under 35 U.S.C. 371 from International Application No. PCT/US99/11555 filed May 26, 1999, which claims priority from Prov. Application No. 60/087,287 filed May 29, 1998.

BACKGROUND OF THE INVENTION

This invention relates to fluoropolymer fibers and films which are receptive to cationic modifying agents such as dyes, whiteners, antistatic agents, and flame retardants, and the fibers or films formed by treatment of the receptive fibers or films of the invention therewith. Such fibers and films are useful in various consumer goods where the products are desirably colored, whitened, antistatic or flame retardant.

Among the properties of fluoropolymers, especially perfluorinated polymers, which make them particularly useful are low friction, hydrophobicity, and chemical inertness. These very properties, however, conspire to make dyeing of fluoropolymers problematical since many dyeing processes involve aqueous baths and reactive dye sites. As a result of these problems, it has become common practice to color fluoropolymers using pigments.

In the area of fluoropolymer fibers, pigmentation must be accomplished in the melt prior to fiber spinning. The solid pigment particles have been found in practice to increase the wear on the high precision spinning equipment, while agglomeration of those particles interferes with polymer flow. Furthermore, in use, it is known that pigmented products may undesirably transfer pigmentation to surfaces in contact with them. Still further, pigmented fibers tend to have a dull appearance. Similar considerations apply to the fabrication of films or sheets by melt casting.

It has long been known in the art that polytetrafluoroethylene (PTFE) at molecular weights below ca. 1 million exhibits excessive brittleness for many practical uses. Thus, the most generally useful PTFE resins and products today have molecular weights in excess of 1 million, typically, 10 million, and though exhibiting a melting point, are not for any practical purpose thermoplastic.

It was found many years ago that a tough, lower molecular weight, melt processable copolymer can be made by copolymerizing tetrafluoroethylene (TFE) with various comonomers to form copolymers containing ca. 1–10 mol-% of a branched monomer unit. Among these comonomers are ethylene, hexafluoropropylene (HFP), and perfluoroalkyl vinyl ethers of the formula: $CF_2=CF-OR_f$, wherein $R_f$ is a perfluoroalkyl group such as perfluoroethyl, perfluoropropyl, or perfluorobutyl.

It has long been known in the art to add sulfonate functionality to polyester and polyamide fibers to provide a reactive site for cationic dyes. Also known in the art are perfluoroalkoxy sulfonyls of the formula, $CF_2=CF(R_f)_n-OCF_2CF_2SO_2X$, wherein $R_f$ is a perfluoroalkyl or a perfluoroalkoxy group, n=0 or 1, and X is F or Cl. Perfluorinated copolymers of TFE and a perfluoroalkoxysulfonyl comonomer of the formula, $CF_2=CF[-OCF_2CF(CF_3)]_n-OCF_2CF_2SO_2F$, wherein n is 0 or 1, and wherein the sulfonyl fluoride group has been hydrolyzed to the related sulfonic acid or sulfonate have long been in widespread commercial use as ion exchange membranes, such as NAFION® ion exchange membranes, available from DuPont. For many end uses, the sulfonyl moiety is converted into an acid or ionic form which is no longer melt processable but is receptive to cationic dyes. However, the ionic form of the comonomer is known to be highly hygroscopic, the physical properties of the resulting copolymer being highly dependent upon moisture content and exhibiting considerable deterioration at high moisture levels. At comonomer concentrations in the range needed to provide melt processibility, fibers produced from the cation-receptive hydrolyzed form of NAFION® are excessively moisture sensitive and thus not suitable for many potential applications.

Other copolymers of TFE, such as those derived from the copolymerization of TFE with a monomer containing an alkylvinylether pendant group may exhibit desirable physical properties and no sensitivity to moisture, but are not cation-receptive.

Connolly et al. (U.S. Pat. No. 3,282,875) disclose certain terpolymers of perfluoroalkoxysulfonyl halides, tetrafluoroethylene, and certain perfluoroalkylvinylethers or higher perfluoro olefins, and methods for their synthesis. However, the mole percents used in Connolly for the components of their terpolymers are designed to produce a cross-linked elastomer.

U.S. Pat. No. 3,692,569 (see Example IX) describes a PTFE yarn coated with a copolymer of tetrafluoroethylene and $CF_2=CFOCF_2CF(CF_3)OCF_2CF_2SO_2F$ which is contacted with a solution of NaOH, followed by rinsing and dipping in dilute HCl and rinsing. The resultant yarn was said to be dyeable with "Sevron", a cationic dye.

What are needed therefore, are fluoropolymer fibers and films that are receptive to modifying agents such as dyes, whiteners, antistatic agents, and flame retardants, which retain their desirable physical and mechanical properties and which do not have the problems and deficiencies of the prior art.

SUMMARY OF THE INVENTION

The present invention provides a blend comprising a first copolymer and a second copolymer; said first copolymer comprising monomeric units of tetrafluoroethylene and a first comonomer selected from the group consisting of: a fluoroalkylvinylether, a fluoroalkene having at least 3 carbons, and ethylene; said second copolymer comprising monomeric units of tetrafluoroethylene and a second comonomer comprising a fluoroalkenyl radical having attached thereto a pendant group comprising a radical represented by the formula:

$-(O-CF_2CFR)_aO-CF_2CFR'Q$, wherein:
R and R' are independently selected from F, Cl or a perfluorinated alkyl group having 1 to 10 carbon atoms;
a=0, 1 or 2;
Q is selected from the group consisting of: $-SO_3^-Z^+$ and $-SO_2X$;
$Z^+$ is $H^+$, an alkali metal cation, or a cation derived from a compound selected from the group consisting of: a cationic dye, a cationic whitener, a cationic flame retardant, a cationic antistatic agent, and mixtures thereof, and
X is F or Cl;
said first copolymer comprising about 0.5–20 mol-% of the first comonomer; said second copolymer comprising about 5–25 mol-% of the second comonomer; and said blend comprising about 1–10% by weight of said second copolymer. The present invention also provides a fiber or a film comprising such a blend.

The present invention further provides a terpolymer, comprising monomeric units of a first termonomer of tetrafluoroethylene; a second termonomer selected from the group consisting of: a fluoroalkylvinylether, a fluoroalkene having at least 3 carbons, and ethylene; and a third termonomer comprising a fluoroalkenyl radical having attached thereto a pendant group comprising a radical represented by the formula —(O—CF$_2$CFR)$_a$O—CF$_2$CFR'Q, wherein:
R and R' are independently selected from F, Cl, or a perfluorinated alkyl group having 1 to 10 carbon atoms;
a=0, 1 or 2;
Q is selected from the group consisting of: —SO$_3^-$Z$^+$ and —SO$_2$X;
Z$^+$ is H$^+$, an alkali metal cation, or a cation derived from a compound selected from the group consisting of: a cationic dye, a cationic whitener, a cationic flame retardant, a cationic antistatic agent, and mixtures thereof; and
X is F or Cl;
said terpolymer comprising about 0.5–5 mol-% of the second termonomer and about 0.1–2 mol-% of the third termonomer. The present invention also provides a fiber or a film comprising such a terpolymer.

The present invention further provides a process for producing a shaped article, the process comprising the steps of mixing a first copolymer and a second copolymer to form a mixture, said first copolymer comprising monomeric units of tetrafluoroethylene and a first comonomer selected from the group consisting of a fluoroalkylvinylether, a fluoroalkene having at least 3 carbons, and ethylene; and said second copolymer comprising monomeric units of tetrafluoroethylene and a second comonomer comprising a fluoroalkenyl radical having attached thereto a pendant group comprising a radical represented by the formula —(O—CF$_2$CFR)$_a$O—CF$_2$CFR'SO$_2$X, wherein R and R' are independently selected from F, Cl or a perfluorinated alkyl group having 1 to 10 carbon atoms; a=0, 1 or 2; and X is F or Cl; said first copolymer comprising about 0.5–20 mol-% of the first comonomer, and said second copolymer comprising about 5–25% of said second comonomer; heating said first and second copolymers simultaneously with or subsequent to mixing, to a temperature sufficient to form a molten blend without significant degradation of either copolymer, said blend comprising about 1–10% by weight of said second copolymer; feeding the molten blend to a shaping device having at least one aperture, each aperture defined therein by a wall; and extruding the molten blend through the at least one aperture to form a shaped article. The present process may further comprise cooling the shaped article and contacting the shaped article with a solution comprising an alkali metal base to yield a cation-receptive shaped article, and may further comprise contacting the cation-receptive shaped article with a cationic modifying agent.

The present invention also provides a process for producing a shaped article, comprising the steps of extruding a composition comprising a molten terpolymer through at least one aperture of a shaping device to form a shaped article, each aperture defined by a wall within said device, said terpolymer comprising monomeric units of a first termonomer of tetrafluoroethylene; a second termonomer selected from the group consisting of a fluoroalkylvinylether, a fluoroalkene having at least 3 carbons, and ethylene; and a third termonomer comprising a fluoroalkenyl radical having attached thereto a pendant group comprising a radical represented by the formula —(O—CF$_2$CFR)$_a$O—CF$_2$CFR'SO$_2$X, wherein R and R' are independently selected from F, Cl or a perfluorinated alkyl group having 1 to 10 carbon atoms, a=0, 1 or 2, and X is F or Cl; said terpolymer comprising about 0.5–5 mol-% of the second termonomer and about 0.1–2 mol-% of the third termonomer. The process may further comprise cooling the shaped article and contacting the shaped article with a solution comprising an alkali metal base to yield a cation-receptive shaped article, and may further comprise contacting the cation-receptive shaped article with a cationic modifying agent.

DETAILED DESCRIPTION

Figure 1:
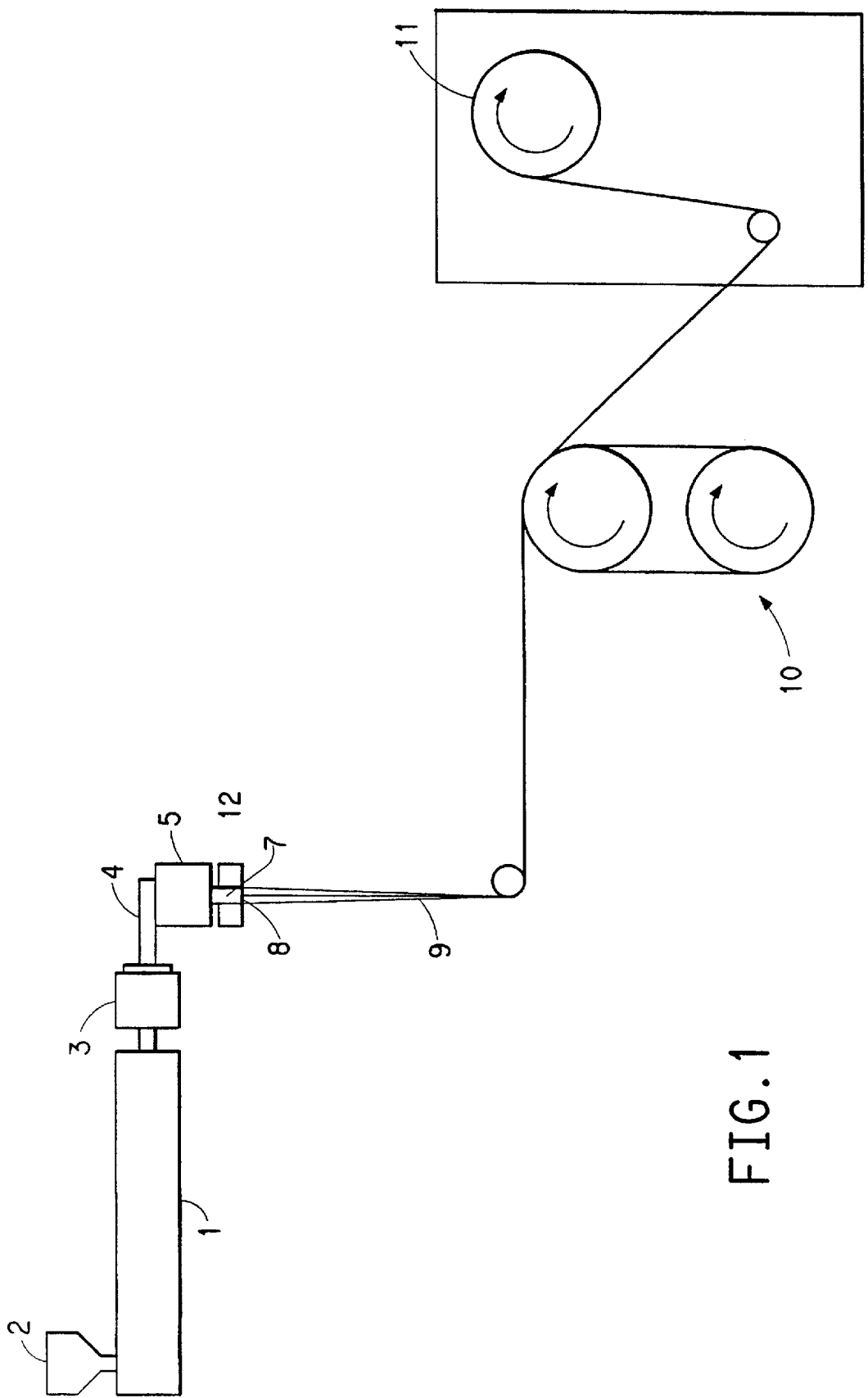
FIG. 1 shows an apparatus for melt spinning of fibers.

The properties of chemical inertness, hydrophobicity, and high melting points have prevented the development of dyeable and other cation-receptive fluorinated fibers and films having useful properties. In a preferred embodiment of the present invention, the objective of dyeability combined with desirable physical properties, such as low moisture-sensitivity, and melt processability are achieved for fluorinated fibers and films by combining a small amount of acid or ionic functionality from a pendant group comprising a radical represented by the formula —(OCF$_2$CFR)$_a$OCF$_2$CFR'SO$_3^-$Z$^+$, with a much larger amount of a fluoroalkyl vinyl ether, a fluoroalkene, or ethylene functionality. This combination can be achieved by blending two PTFE copolymers, each having one of the respective functionalities, or by synthesizing a random terpolymer, incorporating the two functionalities into the same polymer molecule.

The blend of the present invention of two PTFE copolymers comprises a first copolymer comprising monomeric units of tetrafluoroethylene and monomeric units of a first comonomer selected from the group consisting of a fluoroalkylvinylether, a fluoroalkene having at least 3 carbons, and ethylene, and a second copolymer derived from monomeric units of tetrafluoroethyelene and monomeric units of a second comonomer comprising a fluoroalkenyl radical having attached thereto a pendant group comprising a radical represented by the formula: —(O—CF$_2$CFR)$_a$O—CF$_2$CFR'Q, wherein R and R' are independently selected from F, Cl, or a perfluorinated alkyl group having 1 to 10 carbon atoms; a is 0, 1 or 2; and Q is selected from the group consisting of: —SO$_3^-$Z$^+$ and —SO$_2$X, wherein Z$^+$ is H$^+$, an alkali metal cation, or a cation derived from a compound selected from the group consisting of: a cationic dye, a cationic whitener, a cationic flame retardant, a cationic antistatic agent, and mixtures thereof; and X is F or Cl. By "comprising monomeric units of" is meant that the copolymer is derived from the copolymerization of the selected monomers. Preferably the first comonomer is hexafluoropropylene or a perfluoroalkylvinylether, preferably perfluoroethyl- or perfluoropropylvinylether. The first comonomer is present in the first copolymer at a concentration ranging from about 0.5–20 mol-%, preferably 1–3 mol-%. Preferably the second comonomer is perfluorinated, and most preferably R is $CF_3$, R' is F and a is 0 or 1. The second comonomer is present in the second copolymer at a concentration in the range of 5–25 mol-% preferably 12–18 mol-%. Preferred second copolymers include, for example, polymers disclosed in U.S. Pat. Nos. 3,282,875, 4,358,545 and 4,940,525. The equivalent weight of such second copolymers ranges from about 600 to 1900 preferably 900 to 1200, wherein the equivalent weight is the weight of resin in the acid form that will neutralize one equivalent of base. Most preferred second comonomers are perfluoro (3-oxa-4pentene sulfonyl fluoride) or perfluoro(3,6-dioxa-4-methyl-7-octenesulfonyl fluoride). In the blend of the present invention, the second copolymer is present at a concentration in the range of 1–10% by weight, preferably 3–7% by weight.

In order to form the blend described above, the first and second copolymers, which may be in the form of pellets, powders, slurries, or the like, are combined at room temperature by mixing or tumbling together to form a mixture. If in the form of slurries, the copolymer is first dewatered. In the second comonomer when used as starting material to form the second copolymer, Q is $—SO_2X$. The first and second copolymers are heated, simultaneously with or subsequently to mixing, to a temperature sufficient to form a molten blend without significant degradation of either copolymer. This temperature is preferably in the range of about 260 to 400° C. Mixing and melting can take place in a melt mixing device, or alternatively, the copolymers can be mixed and then fed to a melting device or a melt shaping device, such as a melt spinning device.

The present invention provides a process for producing a shaped article comprising the steps of mixing the first and second copolymers described above, heating the first and second copolymers, as described above, to form a molten blend without significant degradation of either copolymer, said second copolymer being present in the blend at a concentration ranging from about 1–10% by weight; feeding the molten blend to a shaping device having at least one aperture, each aperture therein defined by a wall; and extruding the molten blend through the at least one aperture to form a shaped article. For certain blends, such as PSEPVE with PPVE or PEVE, it is preferred that the walls defining the apertures be separately heated from the rest of the shaping device. Most preferably the walls are heated via induction heating. The present process can further comprise cooling the shaped article and contacting the shaped article with a solution comprising an alkali metal base to form a cation-receptive shaped article. Suitable shaping devices can include a melting spinning device or an extrusion die for forming a film. The shaped articles can include a fiber or a film. In the case of a fiber, in order to be spun, the molten blend must have a viscosity that is low enough that melt fracture will not occur. Suitable temperatures for use in the present process will depend on the copolymers selected for use in the present process. The present process can further comprise contacting the cation-receptive shaped article with a cationic modifying agents selected from the group consisting of a cationic dye, a cationic whitener, a cationic flame retardant, a cationic antistatic agent, and mixtures thereof.

Alkali metal base suitable for use in the solution of the present process include aqueous, alcohol, or DMSO solutions of NaOH, KOH, and LiOH having concentrations of ca. 1 molar. Also suitable are aqueous, alcohol or DMSO solutions of alkali metal carbonates such as $Na_2CO_3$.

Preferably in forming a fiber, the aperture is incorporated into a spinneret. Preferably the spinneret has a plurality of apertures each having a cross-sectional dimension in the range of about 0.127 to 1.27 mm. Each aperture is preferably of a round cross-section, although other cross-sections are suitable as well. The fiber produced by extrusion through the spinneret may be spun-drawn or melt-drawn, or undrawn. Post-spin drawing is also an option.

In a preferred embodiment, ease of processibility is achieved by employing a first copolymer of TFE and HFP. TFE/HFP copolymer and a copolymer of TFE and 3,6-dioxa-4-methyl-7-octenesulfonyl fluoride (PSEPVE) melt at temperatures in the range of about 260–290° C. Blends of these copolymers may be conveniently spun into fibers at spinneret temperatures of about 300–380° C. When a high level of physical integrity of the fiber is required at temperatures in excess of 300° C., a second preferred embodiment of the present invention is a blend of a first copolymer of TFE and perfluoropropylvinylether (PPVE) with a second copolymer of TFE and PSEPVE.

In a particularly preferred embodiment of the process of the present invention, 5–10% by weight of a second copolymer of TFE and ca. 14 mol-% PSEPVE is melt blended with 95–90% by weight of a first copolymer of TFE and 1 mol-% PPVE, and spun into fiber. A copolymer of TFE and PSEPVE begins to exhibit degradation at 300° C., and is normally extruded in a temperature range of about 260–290° C. A copolymer of TFE and ca. 1 mol-% PPVE, on the other hand, does not melt below ca. 310° C., and is normally extruded at ca. 350° C. Thus care must be taken to maintain the melt temperature for a blend of these two copolymers at as low a temperature as possible for as much of the time as possible.

In an alternative embodiment, the functionality of the blend of the present invention is incorporated into a single polymer comprising monomeric units of a first termonomer of tetrafluoroethylene; a second termonomer selected from the group consisting of a fluoroalkylvinylether, a fluoroalkene having at least 3 carbons, and ethylene; and a third termonomer comprising a fluoroalkenyl radical having attached thereto a pendant group comprising a radical represented by the formula $$—(O—CF_2CFR)_aO—CF_2CFR'Q,$$

wherein R and R' are independently selected from F, Cl or a perfluorinated alkyl group having 1 to 10 carbon atoms; a=0, 1 or 2; Q is selected from the group consisting of: $—SO_3^-Z^+$ and $—SO_2X$; $Z^+$ is $H^+$, an alkali metal cation, or a cation derived from a compound selected from the group consisting of: a cationic dye, a cationic whitener, a cationic flame retardant, a cationic antistatic agent, and mixtures thereof; and X is F or Cl; said terpolymer comprising about 0.5–5 mol-% of the second termonomer and about 0.1–2 mol-% of the third termonomer.

Preferably, the terpolymer comprises tetrafluoroethylene, a second termonomer consisting of PPVE, perfluoroethylvinylether (PEVE), or HFP and a second comonomer comprising a fluoroalkenyl radical having attached thereto a pendant group comprising a radical represented by the formula 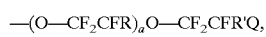, wherein R is trifluoromethyl, R' is F, a is 0 or 1, most preferably 1, and $Z^+$ is $H^+$, or an alkali metal cation.

The terpolymers of the present invention can be prepared using the methods described in Connolly et al. (U.S. Pat. No. 3,282,875) incorporated by reference herein. In general, the terpolymers of the present invention may be melt spun under the same conditions as outlined hereinabove for the blends of corresponding composition.

The present invention further provides a process for producing a shaped article comprising the steps of heating the terpolymer described above at a temperature sufficient to provide a molten terpolymer without significant degradation of the terpolymer; and extruding the molten terpolymer through at least one aperture of a shaping device to form a shaped article, each aperture defined within said device by a wall. For certain terpolymers, such as those comprising PSEPVE with PPVE or PEVE, it is preferred that the walls defining the apertures be separately heated from the rest of the shaping device. Most preferably the walls of the apertures are heated via induction heating. The present process can further comprise cooling the shaped article and contacting the shaped article with a solution comprising an alkali metal base to form a cation-receptive shaped article, and can further comprise contacting the cation-receptive shaped article with a cationic modifying agent selected from the group consisting of a cationic dye, a cationic whitener, a cationic name retardant, a cationic antistatic agent, and mixtures thereof. The shaping device can be the same as that described above for forming the blend of the present invention into a shaped article. Preferably, the temperature for providing the molten terpolymer will range from about 260 to 400° C. Also, it is preferred in the process of the present invention that the walls defining the aperture in the shaping device be separately heated from the rest of the shaping device to a temperature sufficient to reduce the melt viscosity of the terpolymer in order to prevent melt fracture but without a significant amount of degradation. In a preferred embodiment wherein the second termonomer is a vinylether, the walls defining the aperture are heated separately from the rest of the shaping device to a temperature ranging from about 400–500° C. Fiber produced in this manner can be spun-drawn or melt-drawn, or undrawn. Post-spin drawing is also an option.

The fibers and films of the present invention are dyeable with cationic dyes. For example, fibers of the present invention can be contacted with a cationic dye to provide a dyed fiber. Representative examples of cationic dyes are "Sevron" Blue 5G and "Sevron" Brilliant Red. The Sevron dyes employed herein are cationic dyes formerly manufactured by the DuPont Company. The chemistry of cationic dyes is described in Chapter 8 of *Colour Chemistry* by R. L. M. Allen, Apple-Century-Crofts, New York, 1971. Methods of employing cationic dyes are described in *Dyeing Primer* Part 3 published by the American Association of Textile Chemists and Colorists, 1981. Dye assist compounds, such as surfactant and/or dye carrier can be used in dyeing the shaped articles of the present invention. After dyeing, the shaped article can be rinsed with water and dried. The fiber of the present invention can be dyed in a single dye process alone or with other cationic dyeable fibers, such as nylon or polyester, with which it may be blended.

The fibers and films of the present invention can also be modifed with cationic whiteners, cationic antistatic agents, and cationic flame retardants, such as are known in the art.

FIG. 1 shows an apparatus useful in producing the fibers of the present invention from the blends and terpolymers described above. For example, in order to produce fibers from the present blend, the first and second copolymers are fed into hopper 2 either separately or as a mixture and enter screw extruder 1, which is heated, wherein the copolymers form a molten blend. This molten blend is fed to pump block 3 from whence it is conveyed via spinneret adapter 4 to filter pack 5. Filter pack 5 comprises a 200-mesh screen over two 20-mesh screens, not shown. The molten blend is then fed via spinneret 7 to spinneret face 8 having a plurality of holes. The molten blend is extruded through the spinneret holes to form multifilament yarn 9 which is picked up by take-up rolls 10, which control the spinning speed. Finally, yarn 9 is wound up on wind-up roll 11.

Figure 2:
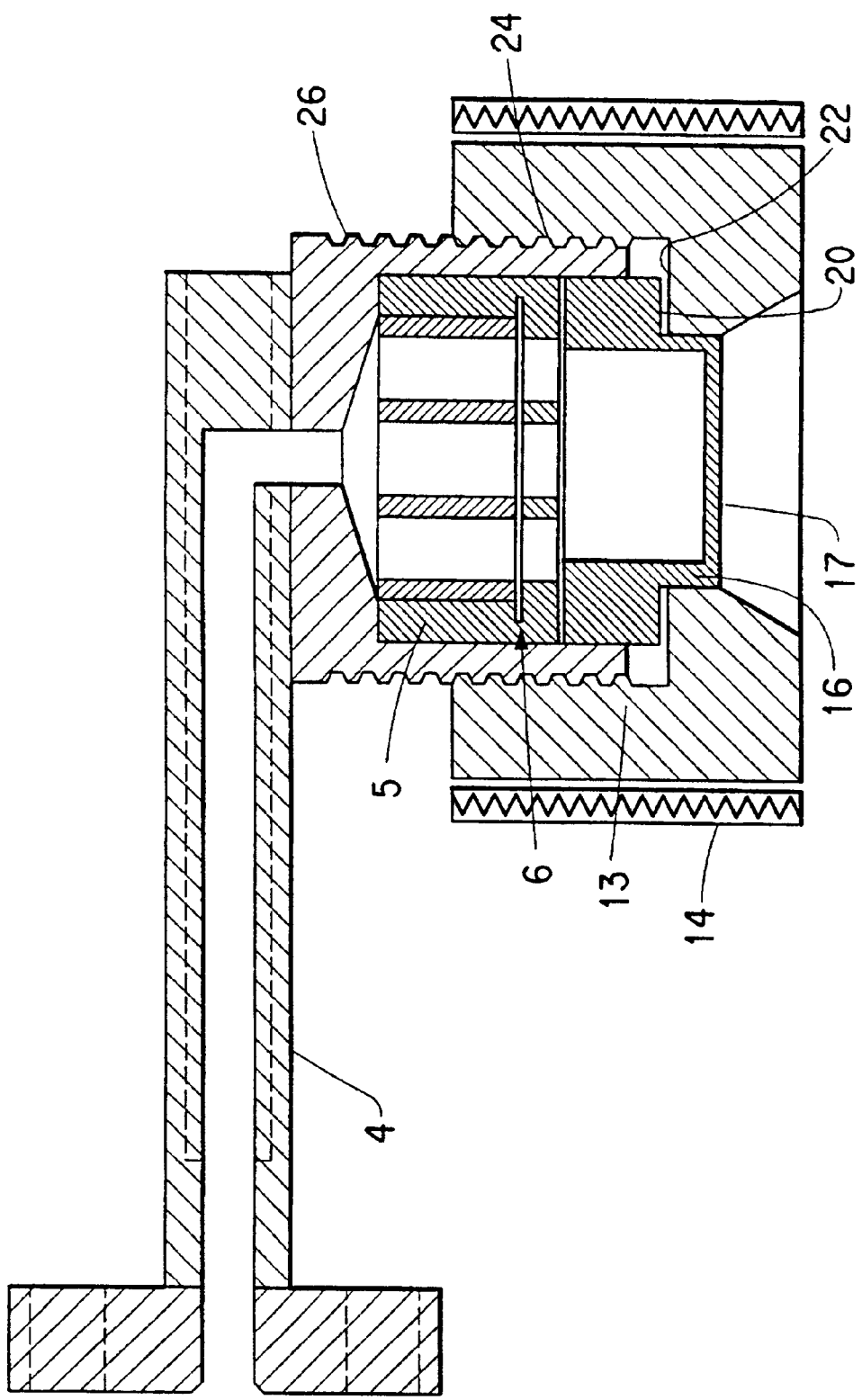
FIG. 2 shows a cross-sectional view of an assembled spinning unit.

FIG. 2 shows a conventional spin pack known in the art consisting of spinneret adapter 4 to filter pack 5 which contains filter screens 6. Spinneret 16 consists of a hollow cylindrical member, one end of which cylinder is open, and the other end being spinneret face 17 having numerous apertures through which polymer can flow. The outer surface of the cylinder has a shoulder 20 to engage inner shoulder 22 of retaining nut 13 which has internal threads 24 to engage external threads 26 of spinneret adapter 4. To prevent melt leakage, metallic O-ring seals, not shown, are provided between the surfaces of pack filter 5 and spinneret adapter 4 and between the surfaces of pack filter 5 and spinneret 16. The height of spinneret 16 is such that spinneret 16 will reside completely within retaining nut 13. The spinneret face 17 is heated by intimate thermal contact with retaining nut 13 which is heated by band heater 14 clamped around its outer surface.

Fiber spinning is by its nature a high shear process. If the viscosity of the melt is too high, melt fracture will occur at spinning speeds too low to be practical. By keeping the melt temperature as low as possible, degradation of either copolymer is kept to a minimum but fiber spinning becomes problematical. It has been found in the practice of the invention that satisfactory results may be achieved by separately heating the spinneret face, and hence the walls of the apertures within, to a temperature well above the degradation temperature of the polymer while maintaining the other parts of the fiber spinning device at temperatures below the degradation temperature. In the process of the invention, when the otherwise highly viscous melt reaches the heated spinneret, the high surface to volume ratio of the polymer in the spinneret holes within the spinneret face leads to rapid heating, with concomitant reduction in melt viscosity, and thus permits rapid throughput with desirably high spinning speed while little additional degradation of the polymer occurs because of the low residence time in the spinneret holes. It is preferred in the process of the present invention that the walls within the spinneret face be heated to a temperature sufficient to reduce the melt viscosity of the blend to prevent melt fracture without significant degradation of either copolymer. For the example of a preferred blend of copolymers of TFE/PPVE with TFE/PSEPVE, heating the spinneret face to ca. 460° C. while keeping the temperature of other parts of the shaping device, such as the extruder and filter pack, at a temperature of about 350° C. is effective. Preferably, the temperature ranges from about 400–500° C. for this particular selection of copolymers.

Figure 3:
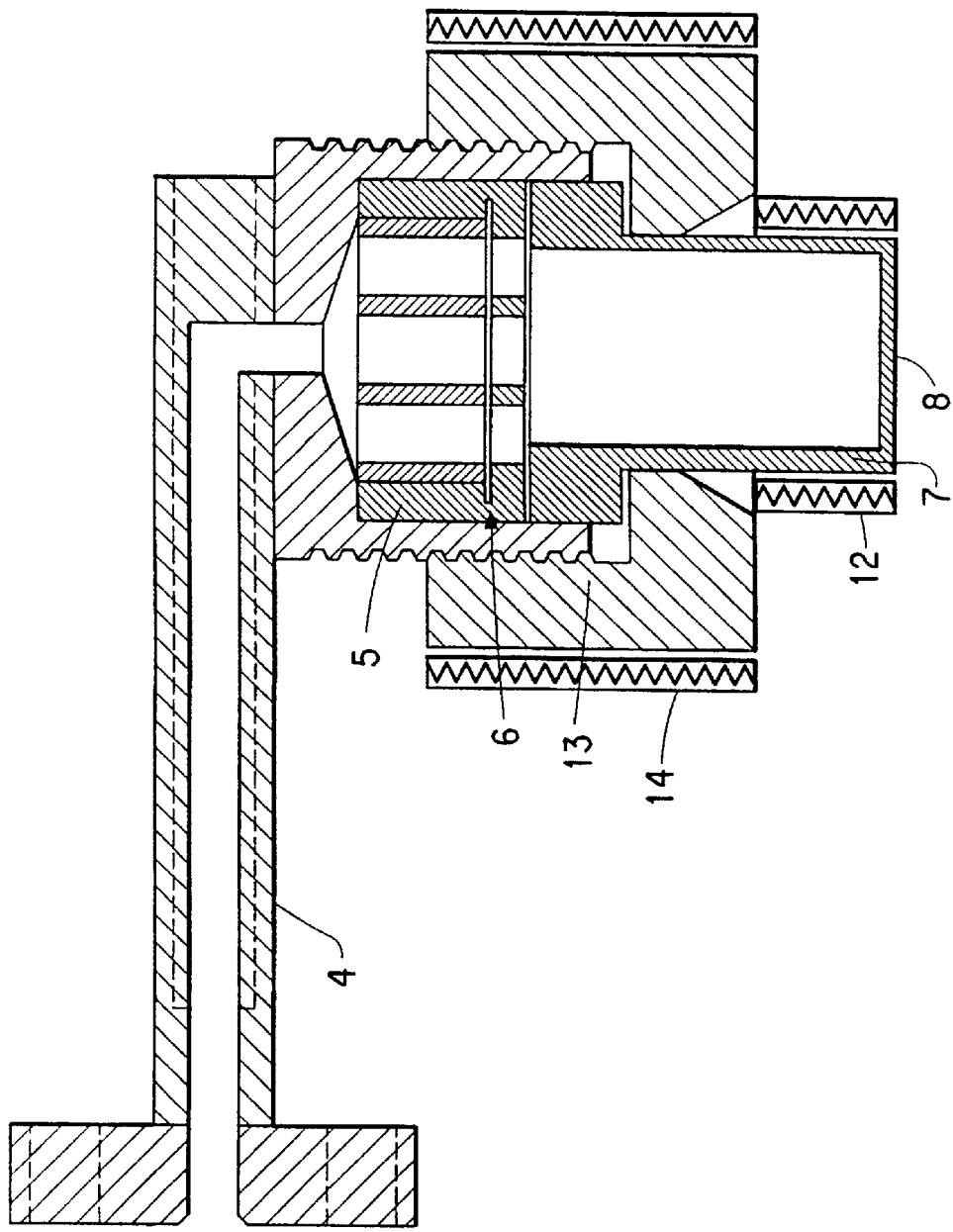
FIG. 3 shows a cross-sectional view of an assembled spinning unit comprising a modified spinneret.

FIG. 3 shows a design for a spin pack preferred for use in the practice of the present invention. All parts are substantially the same as in FIG. 2 with the exception that spinneret 7 is elongated such that a portion of spinneret 7 protrudes from retaining nut 13 and spinneret face 8 is located outside of retaining nut 13. In addition, spinneret face 8 is independently heated via heater 12 thus permitting a higher temperature for spinneret face 8 than that to which the remainder of the spin pack is subject.

This invention is further described by the following specific embodiments.

EXAMPLE 1

5 parts by weight of pellets of a TFE/PSEPVE copolymer containing ca. 16 mol-% of the PSEPVE containing comonomer, available as NAFION® XR resin, from the DuPont Company, Wilmington, Del. (equivalent weight 1064, 11.5 melt flow rate at 270° C.) was tumble-blended at room temperature with 95 parts by weight of pellets of PFA copolymer resin, Teflon® PFA 340, available from DuPont, containing 1.0 mol-% of the PFA containing comonomer and with a melt flow index of 14.7 to form 1,500 g of a pellet blend. The blend was fed to a melt spinning apparatus, substantially as shown in FIG. 1, having a 19.0 mm single screw extruder with L/D of 35, manufactured by Wayne Machine & Die Co., 100 Furier St., Totowa, N.J. 07512–9973, with all controls and pump block added on by DuPont. The filter pack had a 200-mesh screen over two 20-mesh screens. The spinneret was elongated with 50.8 mm to the spinneret face which had 39 holes. The spinneret holes were 0.762 mm in diameter and round in shape with an L/D of 1.0. Then the yarn was wound up on a Leesona Model 959, Lessona Corporation, Warwick, R.I.

The temperature from the extruder to the filter pack was set at 350° C., and the same spinneret at 460° C. At the same extrusion rate of 21.2 grams per minute with a filament jet velocity of 0.795 meters per minute (m/min), the maximum take-up roll speed was 340 m/min before a first filament break and the Spin-Stretch Factor (SSF) was 428. The multifilament yarn had a denier of 561 with individual filament of 12 dpf and a diameter of 28.3 micron. Filament tenacity was 1.18 gpd, with 31% elongation to break.

EXAMPLE 2

The conditions of Example 1 were repeated except that the take up and wind-up speeds were slowed to 200 m/min so that a good package of yarn was obtained for 18 minutes without any broken filaments. The net weight of the 954 denier yarn package was 365 grams. The filament dpf was 23, the tenacity 0.56 gpd, and the elongation to break 58%.

Approximately 1.0 gram skein of the as-spun fiber from Example 2 was boiled in a 250-ml Erlenmeyer glass flask over a hot plate containing 150 ml of 10% sodium hydroxide water solution for about 20 minutes and then rinsed with tap water and then soft water. Excess water on the hydrolyzed fiber was removed by patting between two hand paper towels. The fiber had the same white color appearance as before hydrolysis.

The patted dry fiber was submerged in a dye bath containing a dash of a cationic dye ("Sevron" Brilliant Red" DuPont Co.) and typical dye assist compounds such as surfactant and dye carrier, and boiled for approximately 15 minutes. After dyeing, the fiber was rinsed with tap water and air dried. A second similarly sized fiber sample from Example 2 was dyed blue using "Sevron" Blue 5G dye bath.

Unhydrolyzed controls were also tested for dyeability. The unhydrolyzed controls showed a faint hint of red or blue while the hydrolyzed samples displayed a strong shade of red or blue.

Comparative Example 1

This example demonstrates that the temperature of the melt must be maintained in such a way as to prevent degradation and melt fracture.

The equipment and materials of Example 1 were employed. The extruder temperature was 350° C., the block to the filter pack were set at 400° C., and the spinneret at 460° C. The extrusion rate was at 21.2 grams per minute with a filament jet velocity of 0.795 meters per minute (m/min) and the yarn so formed was taken up by a take-up roll at a maximum speed of only 170 m/min when a first filament broke off from the spinneret. The resulting drawn-down ratio was 239 spin-stretch factor (SSF). The multifilament yarn had a denier of 1,006 with individual denier of 25.8 and a diameter of 41.5 micron. The extruded filament had the look of transparent glittering beads, signs of thermal degradation of the Nafion® XR resin. When the temperature profile was reduced to 350° C. from the extruder to the pack filter and 400° C. at the spinneret, melt fracture resulted.

What is claimed is:

1. A fiber, comprising a blend, comprising: a first copolymer and a second copolymer; said first copolymer comprising monomeric units of tetrafluoroethylene and a first comonomer selected from the group consisting of: a fluoroalkyl vinyl ether, a fluoroalkene having at least 3 carbons, and ethylene; said second copolymer comprising monomeric units of tetrafluoroethylene and a second comonomer comprising a fluoroalkenyl radical having attached thereto a pendant group comprising a radical represented by the formula:

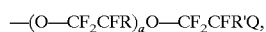
$-(O-CF_2CFR)_aO-CF_2CFR'Q,$ wherein:
R and R' are independently selected from F, Cl or a perfluorinated alkyl group having 1 to 10 carbon atoms;
$a=0$, 1 or 2;
Q is selected from the group consisting of: $-SO_3^-Z^+$ and $-SO_2X$;
$Z^+$ is $H^+$, an alkali metal cation, or a cation derived from a compound selected from the group consisting of: a cationic dye, a cationic whitener, a cationic flame retardant, a cationic antistatic agent, and mixtures thereof; and
X is F or Cl;
said first copolymer comprising about 0.5–20 mol-% of the first comonomer;
said second copolymer comprising about 5–25 mol-% of the second comonomer;
and said blend comprising about 1–10% by weight of said second copolymer.

2. The fiber of claim 1 wherein the first comonomer is hexafluoropropylene, perfluoropropylvinylether, or perfluoroethylvinylether, and the second comonomer is represented by the formula $CF_2=CF-(OCF_2CF-(CF_3))_aOCF_2CF_2SO_3^-Z^+,$ wherein $a=0$ or 1.

3. The fiber of claim 2 wherein $Z^+$ is the cationic dye.

4. A process for producing a fiber, the process comprising the steps of:
mixing a first copolymer and a second copolymer to form a mixture, said first copolymer comprising monomeric units of tetrafluoroethylene and a first comonomer selected from the group consisting of a fluoroalkyl vinyl ether, a fluoroalkene having at least 3 carbons, and ethylene; and said second copolymer comprising monomeric units of tetrafluoroethylene and a second comonomer comprising a fluoroalkenyl radical having attached thereto a pendant group comprising a radical represented by the formula 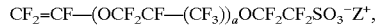 $-(O-CF_2CFR)_aO-CF_2CFR'SO_2X$, wherein R and R' are independently selected from F, Cl or a perfluorinated alkyl group having 1 to 10 carbon atoms; $a=0$, 1 or 2; and X is F or Cl; said first copolymer comprising about 0.5–20 mol-% of the first comonomer, and said second copolymer comprising about 5–25% of monomeric units of said second comonomer;

heating said first and second copolymers, simultaneously with or subsequent to mixing, to a temperature sufficient to form a molten blend without significant degradation of either copolymer, said blend comprising about 1–10% by weight of said second copolymer;

feeding the molten blend to a melt spinning device having a spinneret having at least one aperture, each aperture defined therein by a wall;

extruding the molten blend through the at least one aperture to form a fiber.

5. The process of claim 4 further comprising cooling the fiber and contacting the fiber with a solution comprising an alkali metal base to yield a cation-receptive fiber.

6. The process of claim 5 further comprising contacting the cation-receptive fiber with a cationic modifying agent selected from the group consisting of: a cationic dye, a cationic whitener, a cationic flame retardant, a cationic antistatic agent, and mixtures thereof.

* * * * *